United States Patent
Mohan (10) Patent No.: US 11,100,035 B2
(45) Date of Patent: Aug. 24, 2021

(54) HOT-PLUGGABLE BARREL JACK CONNECTION SYSTEM FOR DATA COMMUNICATION AND POWER

(71) Applicant: ERP POWER, LLC, Moorpark, CA (US)

(72) Inventor: James H. Mohan, Valencia, CA (US)

(73) Assignee: ERP POWER, LLC, Moorpark, CA (US)

( * ) Notice: Subject to any disclaimer, the term of this patent is extended or adjusted under 35 U.S.C. 154(b) by 0 days.

(21) Appl. No.: 16/909,159

(22) Filed: Jun. 23, 2020

(65) Prior Publication Data

US 2020/0409900 A1    Dec. 31, 2020

Related U.S. Application Data

(60) Provisional application No. 62/867,680, filed on Jun. 27, 2019.

(51) Int. Cl.
*G06F 13/40* (2006.01)
*H01R 24/62* (2011.01)
*H01R 24/58* (2011.01)

(52) U.S. Cl.
CPC ......... *G06F 13/4081* (2013.01); *H01R 24/62* (2013.01)

(58) Field of Classification Search
None
See application file for complete search history.

(56) References Cited

U.S. PATENT DOCUMENTS

| | | | | |
|---|---|---|---|---|
| 6,151,653 A | * | 11/2000 | Lin | G06F 13/4009 710/305 |
| 2011/0218692 A1 | * | 9/2011 | Li | G06F 1/28 700/297 |
| 2013/0078869 A1 | * | 3/2013 | Golko | H01R 13/642 439/668 |
| 2014/0277643 A1 | * | 9/2014 | Villarreal | G06F 13/20 700/94 |
| 2016/0148597 A1 | * | 5/2016 | Hamid | G06F 21/31 345/173 |
| 2016/0269842 A1 | * | 9/2016 | Zhao | H04R 5/04 |
| 2017/0111738 A1 | * | 4/2017 | Murray | H04B 5/0037 |

OTHER PUBLICATIONS

Mahonroy, "How to prevent short circuit problems when inserting stereo phono plug into receptacle?", May 14, 2018, All About Circuits, 25 pages <https://forum.allaboutcircuits.com/threads/how-to-prevent-short-circuit-problems-when-inserting-stereo-phono-plug-into-receptacle.148733/> (Year: 2018).*

(Continued)

*Primary Examiner* — Farley Abad
*Assistant Examiner* — Dayton Lewis-Taylor
(74) *Attorney, Agent, or Firm* — Lewis Roca Rothgerber Christie LLP (57) ABSTRACT

A hot-pluggable barrel jack connection system includes a male barrel jack connector including a tip connector at a distal end of the male barrel jack connector and configured to conduct a ground reference voltage, a first ring connector electrically isolated from the tip connector by a first insulator, and configured to conduct a first data signal, and a sleeve connector adjacent to a base of the male barrel jack connector electrically isolated from the first ring connector, and configured to conduct a power signal.

14 Claims, 7 Drawing Sheets

(56) References Cited

OTHER PUBLICATIONS

Electrical Engineering Stack Exchange, "Preventing spikes when plugging jacks", Dec. 3, 2018, 7 pages <https://electronics.stackexchange.com/questions/410227/preventing-spikes-when-plugging-jacks> (Year: 2018).*

Electrical Engineering Stack Exchange, "Protection against audio output shorting", Jun. 2, 2014, 2 pages <https://electronics.stackexchange.com/questions/112845/protection-against-audio-output-shorting> (Year: 2014).*

* cited by examiner

HOT-PLUGGABLE BARREL JACK CONNECTION SYSTEM FOR DATA COMMUNICATION AND POWER

CROSS-REFERENCE TO RELATED APPLICATION(S)

This application claims priority to, and the benefit of, U.S. Provisional Application No. 62/867,680 ("HOT-PLUGGABLE BARREL JACK CONNECTION SYSTEM FOR DATA COMMUNICATION AND POWER"), filed on Jun. 27, 2019, the entire content of which is incorporated herein by reference.

FIELD

Aspects of the present disclosure are related to electrical connectors.

BACKGROUND

Barrel-jack connectors are commonly used as data connectors for serial ports, however such connectors are rarely intended to provide power while also being plugged into a device which itself might already have power (hot-plugging). These connectors are generally intended for data or signaling use only.

Currently, 2.5 mm and 3.5 mm barrel jack audio cables are quite commonly used as data connectors for serial data communication, on simple embedded systems and smart devices, such as phones, tablets, etc. Generally, only data signals (e.g., receive (RX) and/or transmit (TX) signals) and electrical ground are supplied by the cable, and power is expected to be present on the connected target device itself.

Unlike rectangular connectors, when a multi-pin barrel jack connector is inserted into its mating plug, the tip and ring contacts may temporarily short across the sleeve and other ring contacts, which may damage the mating plug and/or the electrical circuit of the target device.

The above information disclosed in this Background section is only for enhancement of understanding of the disclosure, and therefore it may contain information that does not form the prior art that is already known to a person of ordinary skill in the art.

SUMMARY

Aspects of embodiments of the present disclosure are directed to a barrel jack connection system capable of providing both power and data to a target device and being hot-plugged into the target device (i.e., being plugged in while the target device is powered up) without causing damage or interruptions in power and operations.

According to some embodiments of the present disclosure, there is provided a hot-pluggable barrel jack connection system including: a male barrel jack connector including: a tip connector at a distal end of the male barrel jack connector and configured to conduct a ground reference voltage; a first ring connector electrically isolated from the tip connector by a first insulator, and configured to conduct a first data signal; and a sleeve connector adjacent to a base of the male barrel jack connector electrically isolated from the first ring connector, and configured to conduct a power signal.

In some embodiments, the first ring connector is configured to receive the first data signal.

In some embodiments, the male barrel jack connector further includes: a second ring connector electrically isolated from the first ring connector by a second insulator, and configured to conduct a second data signal, the sleeve connector is electrically isolated from the second ring connector by a third insulator.

In some embodiments, the first ring connector is configured to transmit the second data signal.

In some embodiments, the tip and sleeve connectors are respectively electrically coupled to a reference ground and a power supply of a first electrical device, and the first and second ring connectors are respectively electrically coupled to a receiver front end and a transmitter front end of the first electrical device.

In some embodiments, the sleeve connector, the first ring connector, and the tip connector are arranged along an axial direction of the male barrel jack connector and extend away from the base.

In some embodiments, the hot-pluggable barrel jack connection system further includes: a female barrel jack connector configured to mate with the male barrel jack connector in a fully-mated state, and including: a ground terminal configured to contact the tip connector in the fully-mated state; a second data terminal configured to contact the first ring connector in the fully-mated state; and a power terminal configured to contact the sleeve connector in the fully-mated state.

In some embodiments, the female barrel jack connector further includes: a first data terminal configured to contact a second ring connector of the male barrel jack connector in the fully-mated state.

In some embodiments, the first data terminal is configured to transmit a data signal.

In some embodiments, the ground and power terminals are respectively electrically coupled to a reference ground and a power supply of a second electrical device, and the first and second data terminals are respectively electrically coupled to a receiver front end and a transmitter front end of the second electrical device.

In some embodiments, the power terminal is electrically coupled to an anode of a blocking diode, a cathode of the blocking diode being configured to be electrically coupled to a power supply of a second electrical device coupled to the female barrel jack connector.

In some embodiments, the ground terminal and the second data terminal are spring terminals.

In some embodiments, the male barrel jack connector is electrically coupled to a programming device, and the female barrel jack connector is electrically coupled to a programmable light emitting diode (LED) driver device.

In some embodiments, the male barrel jack connector is coupled to a universal serial bus (USB) connector via a USB-UART converter.

BRIEF DESCRIPTION OF THE DRAWINGS

The accompanying drawings, together with the specification, illustrate example embodiments of the present disclosure, and, together with the description, serve to explain the principles of the present disclosure.

DETAILED DESCRIPTION

The detailed description set forth below is intended as a description of example embodiments of a hot-pluggable barrel jack connection system, provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the spirit and scope of the disclosure. As denoted elsewhere herein, like element numbers are intended to indicate like elements or features.

Some embodiments of the present disclosure are directed to a hot-pluggable barrel jack connection system capable of providing both electrical power and data to a target device. According to some embodiments, the particular pin configurations of the male and female barrel jack connectors and the supporting device circuitry allow a 2.5 mm or 3.5 mm barrel jack audio connector to deliver both power and data signaling (e.g., RX and TX for serial data), using one connector that is hot-pluggable, meaning that the male and female barrel jack connectors can be mated while the target device is already powered up, without causing harm or power disruptions to the target device.

Figure 1:
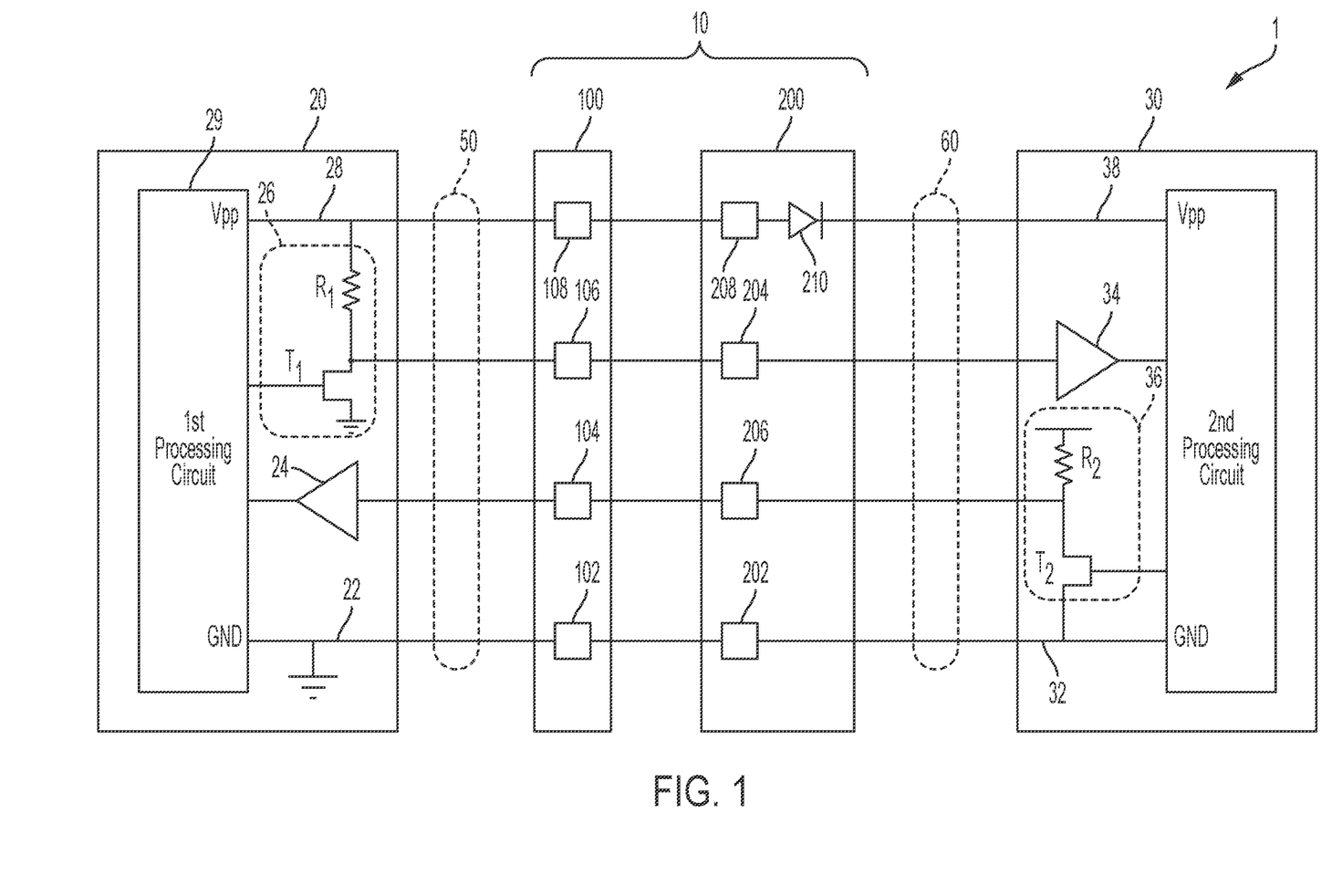
FIG. 1 is a schematic diagram illustrating the hot-pluggable barrel jack connection system for connecting a first electrical device to a second electrical device, according to some embodiments of the present disclosure.
Figure 2:
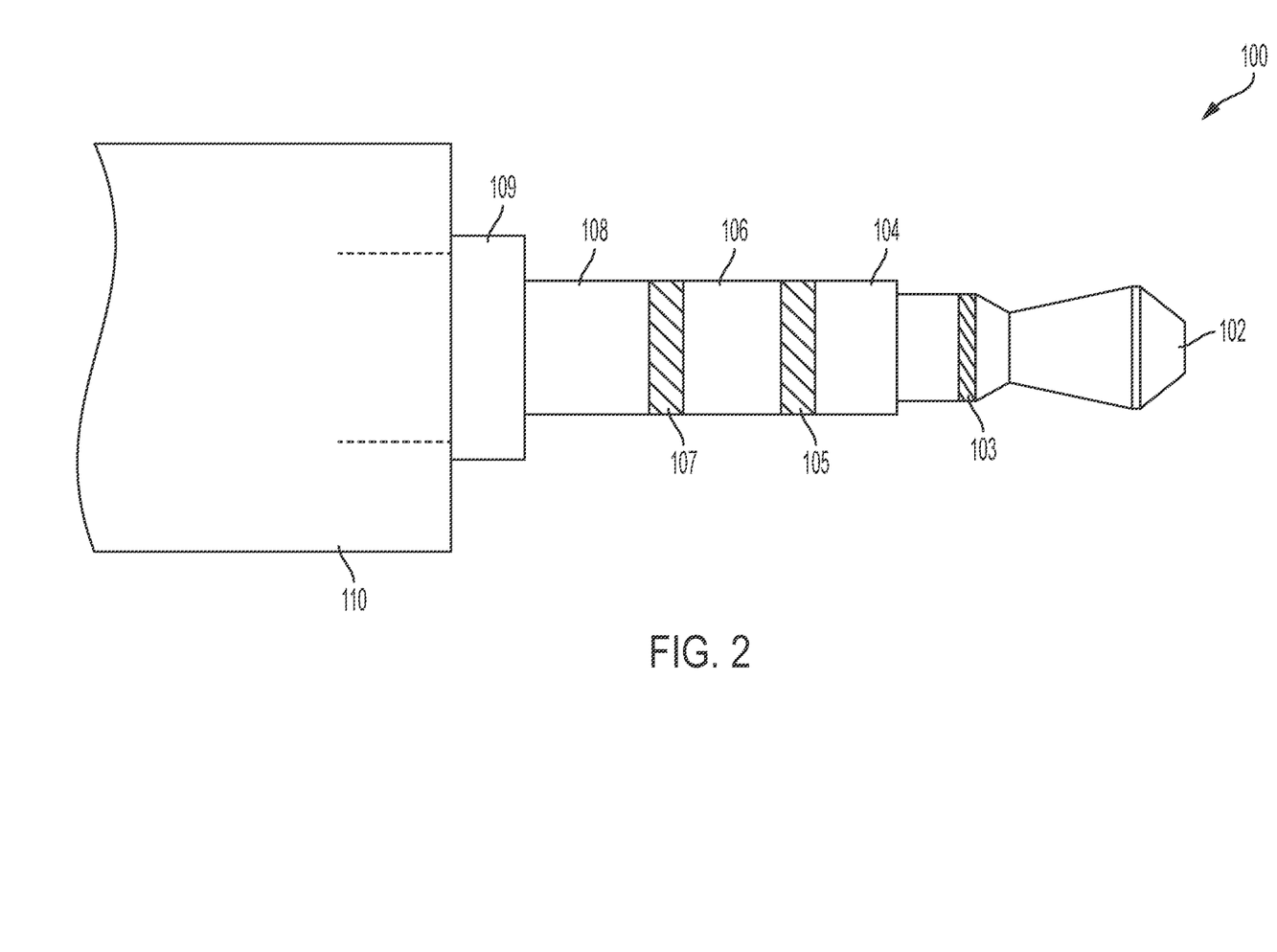
FIG. 2 is a schematic diagram illustrating the male barrel jack connector of the hot-pluggable barrel jack connection system, according to some embodiments of the present disclosure.
Figure 3:
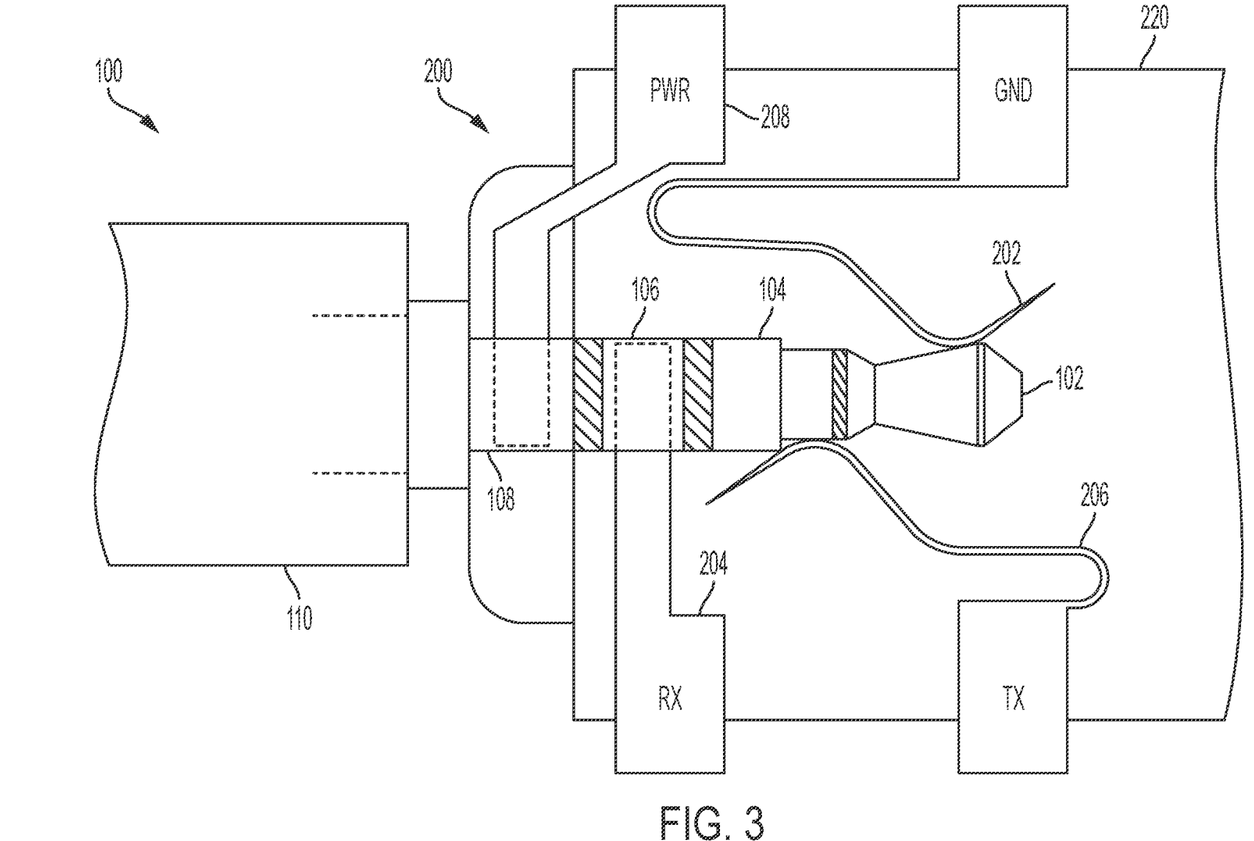
FIG. 3 illustrates the male barrel jack connector in a fully-mated state with the female barrel jack connector of the hot-pluggable barrel jack connection system, according to some embodiments of the present disclosure.

FIG. 1 is a schematic diagram illustrating the hot-pluggable barrel jack connection system 10 for connecting a first electrical device 20 to a second electrical device 30, according to some embodiments of the present disclosure. FIG. 2 is a schematic diagram illustrating the male barrel jack connector 100 of the hot-pluggable barrel jack connection system 10, according to some embodiments of the present disclosure. FIG. 3 illustrates the male barrel jack connector 100 in a fully-mated state with the female barrel jack connector 200, according to some embodiments of the present disclosure.

Referring to FIG. 1, in some embodiments, the hot-pluggable barrel jack connection system 10 enables bi-directional communication between the first and second electrical devices 20 and 30 and allows for the provision of both ground and power supply voltages through the hot-pluggable barrel jack connection system 10. In some examples, the first electrical device 20 may be a computer, an external sensor (e.g., a temperature sensor), or a controlling device, and the second electrical device 30 may be a peripheral or auxiliary device, such as a headphone, a storage device, a webcam, a light emitting diode (LED) driver, or the like. However, embodiments of the present disclosure are not limited thereto, and the first and second electrical devices may be any suitable devices in serial communication with one another.

According to some embodiments, the hot-pluggable barrel jack connection system 10 includes a male barrel jack connector 100 that is electrically coupled to the first electrical device 20 via a first multi-wire conduit (e.g., a first cable) 50, and includes a female barrel jack connector 200 that is electrically coupled to the second electrical device 30 via a second multi-wire conduit (e.g., a second cable) 60. The male and female barrel jack connectors 100 and 200 are configured to mate with one another and to electrically couple corresponding circuit elements of the first and second electrical devices 20 and 30 to one another.

In some examples, each of the first and second electrical devices 20 and 30 may include a ground terminal 22/32 that provides/is supplied with the ground reference voltage (GND or 0 V), a receiver front end 24/34 having a high input impedance, a transmitter front end 26/36, and a power supply terminal 28/38 configured to provide/receive a power supply voltage VPP, which may be connected to a first/second processing circuit 29/39 that may be any combination of hardware, firmware, and software. In some examples, the first electrical device 20 provides the power supply voltage VPP to the second electrical device 30 through the hot-pluggable barrel jack connection system 10; however, embodiments of the present disclosure are not limited thereto and the second electrical device 30 may be independently powered (e.g., have its own internal power supply).

While in the example of FIG. 1, the transmit and receive signals are digital signals, embodiments of the present disclosure are not limited thereto, and with the appropriate circuitry, the data signals may be analog signals as well.

Referring to FIGS. 1-2, in some embodiments, the male barrel jack connector 100 includes a tip connector (e.g., a tip conductor) 102 at a distal end of the male barrel jack connector 100, a first ring connector (e.g., a first ring conductor) 104 electrically isolated from the tip connector 102 by a first insulator 103 (e.g., a first insulating ring), a second ring connector (e.g., a second ring conductor) 106 electrically isolated from the first ring connector 104 by a second insulator 105 (e.g., a second insulating ring), and a sleeve connector (e.g., a sleeve or shaft conductor) 108 adjacent to a base 109 of the male barrel jack connector 100 and electrically isolated from the second ring connector 106 by a third insulator 107 (e.g., a third insulating ring). The base 109 may be coupled to a jacket 110 of the male barrel jack connector 100 that allows for handling of the connector. The tip connector 102, the first and second ring connectors 104 and 106, and the sleeve connector 108 may be arranged along an axial direction of the male barrel jack connector 100 and extend away from the base 109.

According to some embodiments, the tip connector 102 is configured to conduct the ground reference voltage (GND), the first and second ring connectors 104 and 106 are configured to conduct first and second data signals, respectively, and the sleeve connector 108 is configured to conduct the power supply voltage (VPP). The first ring connector 104 may be coupled to the receiver front end 24 and be configured to receive the first data signal from the second electrical device 30, and the second ring conductor 106 may be coupled to the transmitter front end 26 and be configured to transmit the second data signal to the second electrical device 30. However, embodiments of present disclosure are not limited thereto, and the first and second ring connectors 104 and 106 are interchangeable and can each be utilized as a signal receiver or a signal transmitter depending on the circuitry attached thereto.

In embodiments in which the male barrel jack connector 100 has both the first and second ring connectors 104 and 106, the male barrel jack connector 100 may be a 2.5 mm or 3.5 mm TRRS (tip, ring, ring, sleeve) barrel plug connector or a TRRRS (tip, ring, ring, ring, sleeve) barrel plug connector. In some embodiments, the two ring connectors 104 and 106 may be replaced with a single ring connector that is used to both transmit and receive signals. In such embodiments, the single ring connector may be coupled to transceivers at each of the first and second electrical devices 20 and 30, rather than separate transmitters and receivers. In such embodiments, the male barrel jack connector 100 may be a 2.5 mm or 3.5 mm TRS barrel plug connector.

Referring now to FIGS. 1 and 3, according to some embodiments, the female barrel jack connector 200 has a cavity within the packaging 220 that is configured to accommodate the connectors 102-108 of the male barrel jack connector 100. The male and female barrel jack connectors 100 and 200 are fully mated when the male barrel jack connector 100 is fully inserted into the cavity. The female barrel jack connector 200 includes a ground terminal (e.g., a ground spring terminal) 202 configured to contact the tip connector 102 in the fully-mated state, a first data terminal (e.g., a first data spring terminal) 204 configured to contact the second ring connector 106 in the fully-mated state, a second data terminal (e.g., a second data spring terminal) 206 configured to contact the first ring connector 104 in the fully-mated state, and a power terminal (e.g., a sleeve/power spring terminal) 208 configured to contact the sleeve connector 108 in the fully-mated state. The terminals of the female barrel jack connector 200 may be spring terminals that are capable of small movements in response to the force exerted by the insertions of the male barrel jack connector 100.

In some embodiments, the power terminal 208 is electrically coupled to an anode of a blocking diode 210, which has a cathode that is configured to be electrically coupled to a power node VPP of a second electrical device 30 coupled to the female barrel jack connector 200. This blocking diode 210 allows power to flow from the male barrel jack connector 100 to the mating female barrel jack connector 200, but not the reverse. This can prevent the inadvertent shorting of the ground of the first electrical device 20 with an active power supply of the second electrical device 30.

Figure 4A:
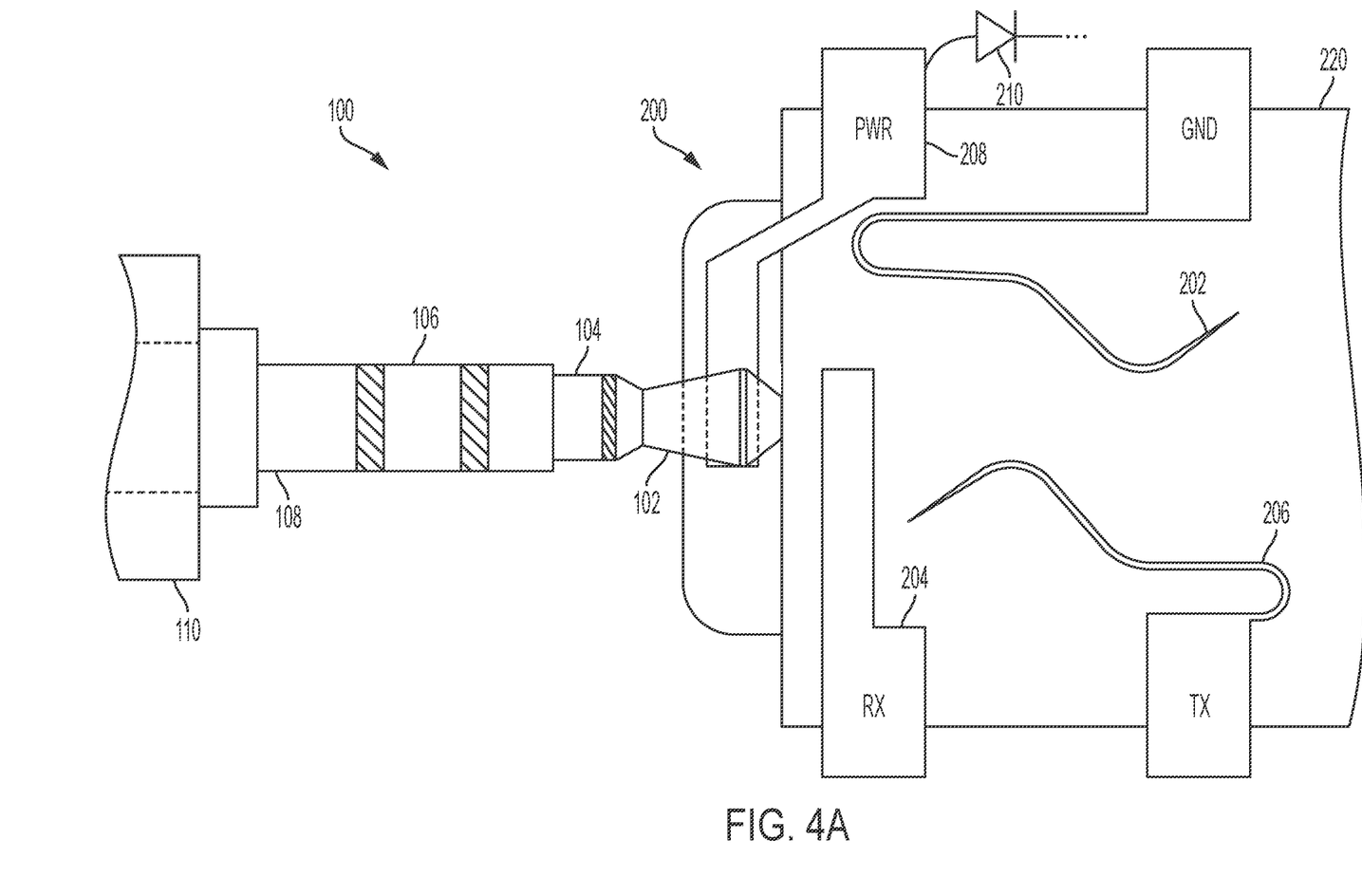
FIGS. 4A-4C illustrate the male barrel jack connector in various stages of insertion into the female barrel jack connector, according to some embodiments of the present disclosure.
Figure 4B:
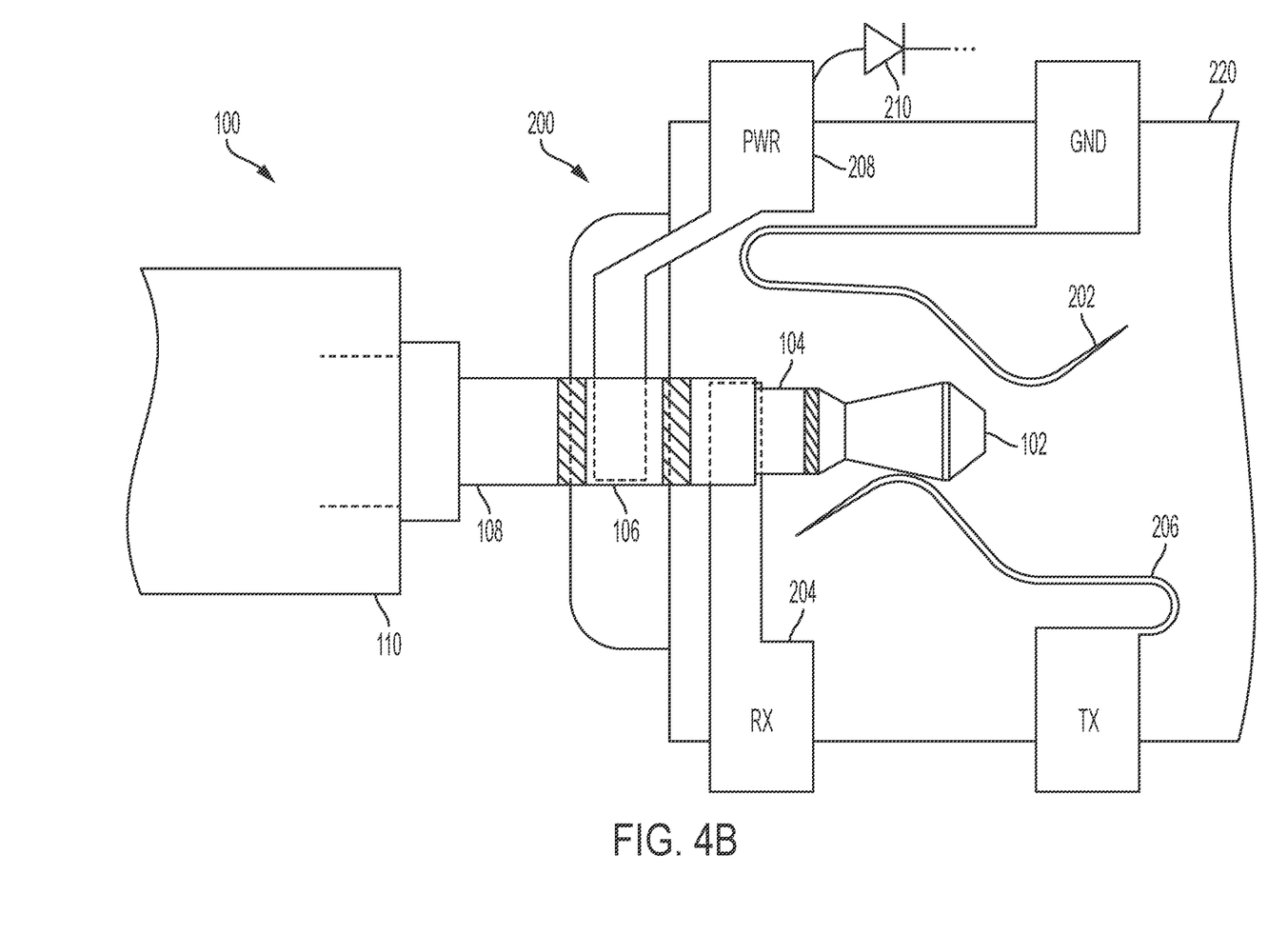
Figure 4C:
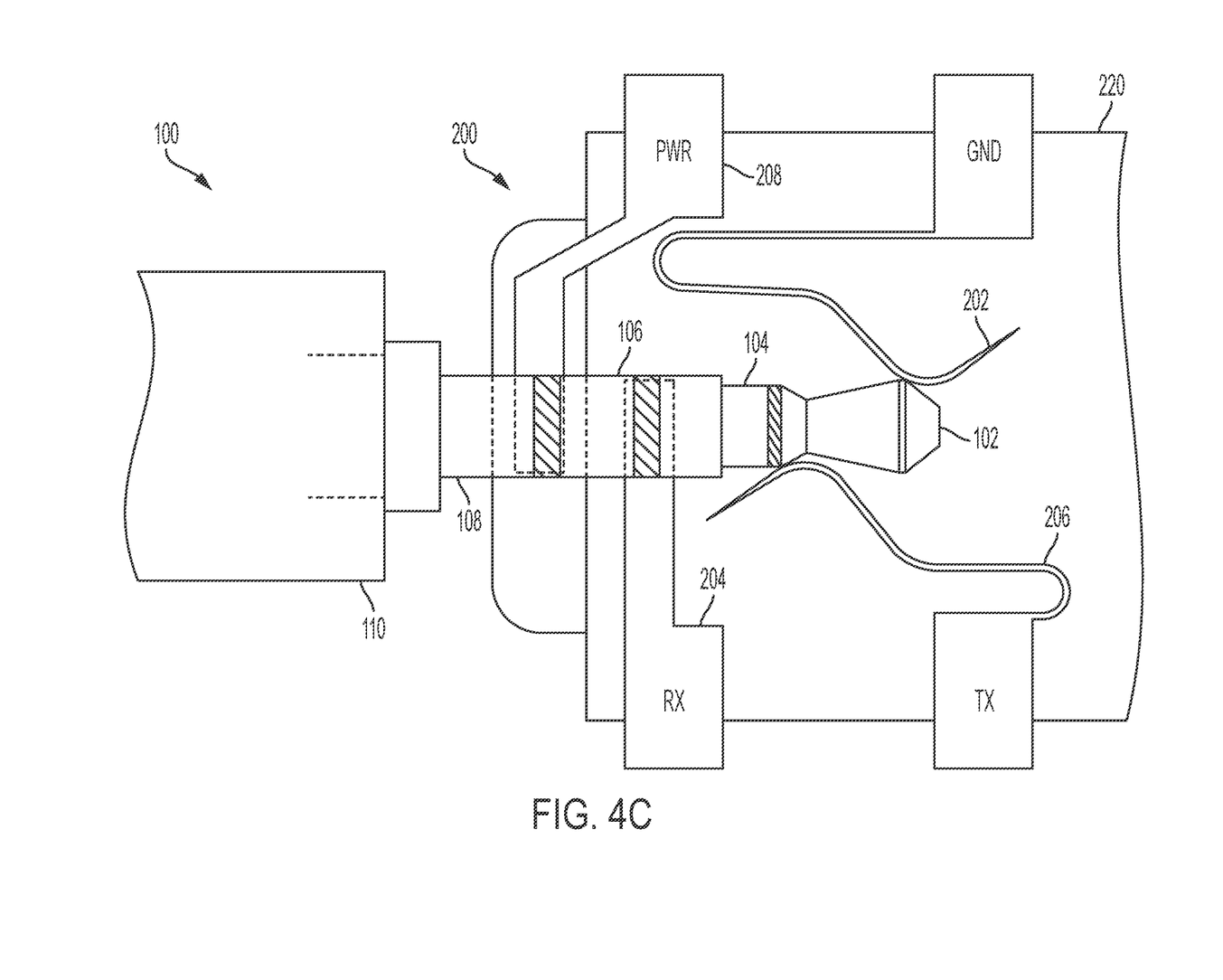

FIGS. 4A-4C illustrate the male barrel jack connector 100 in various stages of insertion into the female barrel jack connector 200, according to some embodiments of the present disclosure.

Referring to FIG. 4A, as the male barrel jack connector 100 is inserted into the cavity of the mating female barrel jack connector 200, the tip connector 102 may temporarily contact the power terminal 208. In the absence of the blocking diode 210, in examples in which the second electrical device 30 has an independent power supply source and the power terminal 208 is at a non-zero voltage, this contact could cause significant current draw from the independent power supply source, which may cause the second electrical device 30 to momentarily lose power or be damaged as a result. However, as the blocking diode 210 prevents current from flowing from the power terminal 208 to the tip connector 102, such power loss and/or damage can be avoided, so long as the voltage difference between the power terminal 208 and the tip connector 102 is below the breakdown voltage of the blocking diode 210.

Further, as illustrated in FIG. 4B, having the power terminal 208 temporarily contact the first and second ring connectors 104 and 106, may be harmless as the blocking diode 210 prevents any current from flowing from the power terminal 208 to the receiver front end 24 or the transmitter front end 26. Thus, even if an active (e.g., an independently powered) power terminal 208 contacts the second data connector 106 as the first transmitter front end 26 is trying to transmit a low voltage signal (e.g., a logic low, or 0 V signal), the blocking diode 210 prevents the power terminal 208 from forcing the second ring connector 106 to a high voltage, thus saving the first transmitter front end 26 from any damage that may otherwise occur.

As illustrated in FIG. 4C, during insertion, the tip connector 102 of the male barrel jack connector 100 may temporarily contact the first and/or second data terminals 204 and/or 206. However, shorting either the receiver front end 34 or the transmitter front end 36 at the second electrical device 30 may not cause any harm. Even if the contact occurs as the second electrical device 30 is transmitting through the second data terminal 206, shorting the second data terminal 206 to ground will only result in a small current draw (which, e.g., may be about several mA) through the pull-up resistor R2, which may not damage the second electrical device 30. In the related art, the tip connector may be at the power supply voltage (e.g., VPP). Thus, if the powered tip connector of the related art contacts a terminal that is trying to transmit a low voltage signal (e.g., a logic low or a 0 V signal), the second transmitter front end 36 may be damaged. According to some embodiments, the male barrel jack connector 100 avoids this problem by having the tip connector 102 conduct a ground voltage. Having the sleeve connector assigned to the power supply voltage (VPP) also prevents this powered connector from making accidental contacts with terminals of the female barrel jack connector 200 other than the power terminal.

Further, even if one of the terminals of the female barrel jack connector 200 (e.g., the first data terminal 204) shorts across both of the first and second ring connectors 104 and 106, this may not harm the receiver and transmitter front ends 24/34 and 26/36 as the circuits are designed to handle the small resulting currents without any damage being caused.

Therefore, as the process of inserting the male barrel jack connector 100 into an active (e.g., powered) female barrel jack connector 200 does not cause any harm to either of the electrical devices 20 and 30 or cause any power disruptions, the male barrel jack connector 100 and the mating female barrel jack connector 200 are hot-pluggable.

According to some embodiments, having the tip connector 102 assigned to ground, allows the second electrical device 30 to detect whether it is being connected to or disconnected from the first electrical devices 20 by monitoring the data terminals 204 and 206 to identify long periods during which the second data terminal 206 is held at logic low (shorted to ground). In some examples, the low period that triggers the connection/disconnection determinations may be about 10 mS to 500 mS, which is significantly longer than even the slowest date rate, such as 19200 baud. As the spring terminals of the female barrel jack connector 200 may bounce when a mating connection is made or when the connection is severed, in some examples, the random bouncing of one or more of the terminals 202-208 may be used to detect a connection/disconnection event.

Figure 5:
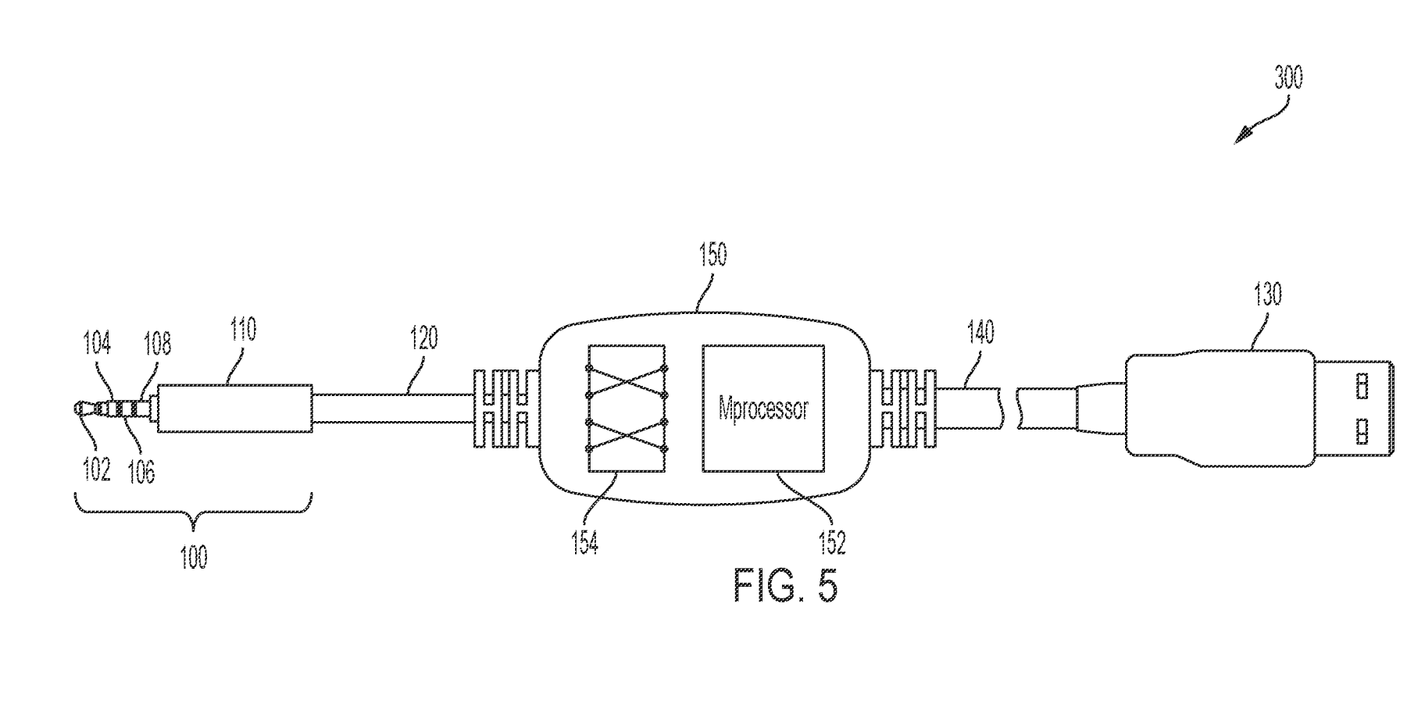
FIG. 5 illustrates a USB-jack converter cable, according to some example embodiments of the present disclosure.

FIG. 5 illustrates a USB-jack converter cable 300, according to some example embodiments of the present disclosure.

In some embodiments, the male barrel jack connector 100 is part of the USB-jack converter cable 300, which may be utilized as a serial programming and power cable (e.g., to program an LED driver). The USB-jack converter cable 300 may further include a USB connector 130 and a USB-UART converter 150 for converting USB signals to UART signals and vice-versa, which also may convert the power and signal voltage levels from the typical 5 V of USB to the proper target voltage for the mating device, such as 3.3 V. The USB-UART converter 150 may include a processor 152 for performing said conversion and a connection mapper 154 for routing the appropriate signals to the tip, sleeve, and ring connectors 102, 108, 104, and 106 of the male barrel jack connector 100. The male barrel jack connector 100 may be coupled to the USB-UART converter 150 by a first cable 120, and the USB connector 130 may be coupled to the USB-UART converter 150 by a second cable 140. In some examples, the male barrel jack connector 100 may be electrically coupled to a programming device, and the female barrel jack connector 200 may be electrically coupled to a programmable light emitting diode (LED) driver device.

According to some embodiments, the barrel jack connectors 100 and 200 allow the peripheral/target device, which may be a programmable driver, to use an extremely inexpensive, multi-pin connection system for communication, programming, and power. Further, as the barrel jack connector 100 cannot be inserted incorrectly, it protects against user error when inserting the connector. Additionally, the barrel jack connectors are very durable, are generally rated for tens of thousands of connection cycles, and have a small footprint size. Further, the particular pinout configurations of the barrel jack connectors 100 and 200 along with the blocking diode ensure that the barrel jack connector can be hot-plugged into the peripheral/target device, without causing damage or interruptions in power and operations.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the terms "substantially", "about", and similar terms are used as terms of approximation and not as terms of degree, and are intended to account for the inherent variations in measured or calculated values that would be recognized by those of ordinary skill in the art.

As used herein, the terms "use", "using", and "used" may be considered synonymous with the terms "utilize", "utilizing", and "utilized", respectively.

The hot-pluggable barrel jack connection system and/or any other relevant devices or components according to embodiments of the present disclosure described herein may be implemented by utilizing any suitable hardware, firmware (e.g., an application-specific integrated circuit), software, or a suitable combination of software, firmware, and hardware. For example, the various components of the independent multi-source display device may be formed on one integrated circuit (IC) chip or on separate IC chips. Further, the various components of the hot-pluggable barrel jack connection system may be implemented on a flexible printed circuit film, a tape carrier package (TCP), a printed circuit board (PCB), or formed on the same substrate. Further, the various components of the hot-pluggable barrel jack connection system may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

While this disclosure has been described in detail with particular references to illustrative embodiments thereof, the embodiments described herein are not intended to be exhaustive or to limit the scope of the disclosure to the exact forms disclosed. Persons skilled in the art and technology to which this disclosure pertains will appreciate that alterations and changes in the described structures and methods of assembly and operation can be practiced without meaningfully departing from the principles, spirit, and scope of this disclosure, as set forth in the following claims and equivalents thereof.

What is claimed is:

1. A hot-pluggable barrel jack connection system comprising:
    a male barrel jack connector comprising:
        a tip connector at a distal end of the male barrel jack connector and configured to conduct a ground reference voltage of a first electrical device;
        a first ring connector electrically isolated from the tip connector by a first insulator, and configured to conduct a first data signal; and a sleeve connector adjacent to a base of the male barrel jack connector electrically isolated from the first ring connector, and configured to conduct a power signal; and a female barrel jack connector configured to mate with the male barrel jack connector in a fully-mated state, and comprising:

a power terminal configured to contact the sleeve connector in the fully-mated state, wherein the power terminal is electrically coupled to a blocking diode that is configured to prevent a temporary shorting of the ground reference voltage of the first electrical device with an active power supply of a second electrical device coupled to the female barrel jack connector during mating of the male and female barrel jack connectors.

2. The hot-pluggable barrel jack connection system of claim 1, wherein the first ring connector is configured to receive the first data signal.

3. The hot-pluggable barrel jack connection system of claim 1, wherein the male barrel jack connector further comprises:

a second ring connector electrically isolated from the first ring connector by a second insulator, and configured to conduct a second data signal, wherein the sleeve connector is electrically isolated from the second ring connector by a third insulator.

4. The hot-pluggable barrel jack connection system of claim 3, wherein the first ring connector is configured to transmit the second data signal.

5. The hot-pluggable barrel jack connection system of claim 4, wherein the tip and sleeve connectors are respectively electrically coupled to a reference ground and a power supply of the first electrical device, and wherein the first and second ring connectors are respectively electrically coupled to a receiver front end and a transmitter front end of the first electrical device.

6. The hot-pluggable barrel jack connection system of claim 1, wherein the sleeve connector, the first ring connector, and the tip connector are arranged along an axial direction of the male barrel jack connector and extend away from the base.

7. The hot-pluggable barrel jack connection system of claim 1, wherein the female barrel jack connector further comprises:

a ground terminal configured to contact the tip connector in the fully-mated state;

a second data terminal configured to contact the first ring connector in the fully-mated state.

8. The hot-pluggable barrel jack connection system of claim 7, wherein the female barrel jack connector further comprises:

a first data terminal configured to contact a second ring connector of the male barrel jack connector in the fully-mated state.

9. The hot-pluggable barrel jack connection system of claim 8, wherein the first data terminal is configured to transmit a data signal.

10. The hot-pluggable barrel jack connection system of claim 8, wherein the ground and power terminals are respectively electrically coupled to a reference ground and a power supply of the second electrical device, and wherein the first and second data terminals are respectively electrically coupled to a receiver front end and a transmitter front end of the second electrical device.

11. The hot-pluggable barrel jack connection system of claim 7, wherein the power terminal is electrically coupled to an anode of the blocking diode, a cathode of the blocking diode being configured to be electrically coupled to a power supply of the second electrical device coupled to the female barrel jack connector.

12. The hot-pluggable barrel jack connection system of claim 7, wherein the ground terminal and the second data terminal are spring terminals.

13. The hot-pluggable barrel jack connection system of claim 7, wherein the male barrel jack connector is electrically coupled to a programming device, and the female barrel jack connector is electrically coupled to a programmable light emitting diode (LED) driver device.

14. The hot-pluggable barrel jack connection system of claim 1, wherein the male barrel jack connector is coupled to a universal serial bus (USB) connector via a USB-UART converter.

* * * * *